Nov. 22, 1966 G. J. OVERTVELD 3,287,507
ELECTRICAL CONTROL CIRCUIT
Filed May 17, 1963 2 Sheets-Sheet 1

INVENTOR
GILLES J. OVERTVELD
BY Smart & Biggar
ATTORNEYS.

Nov. 22, 1966 G. J. OVERTVELD 3,287,507

ELECTRICAL CONTROL CIRCUIT

Filed May 17, 1963 2 Sheets-Sheet 2

INVENTOR
GILLES J. OVERTVELD
BY Smart & Biggar
ATTORNEYS.

United States Patent Office 3,287,507
Patented Nov. 22, 1966

3,287,507
ELECTRICAL CONTROL CIRCUIT

Gilles J. Overtveld, Ottawa, Ontario, Canada, assignor to Northern Electric Company Limited, Montreal, Quebec, Canada

Filed May 17, 1963, Ser. No. 281,274
4 Claims. (Cl. 179—170.6)

This invention relates to an electrical control circuit which may be used to control the direction of speech transmission in a two-way voice switched amplifier system.

One of the problems encountered in a two-way voice communications system is the elimination of acoustic feedback. If, in such a system, the microphone and loudspeaker are placed in close proximity and the total loop gain of the system (i.e., the amplifier gains in both directions minus the acoustic loss at both ends) is allowed to approach unity, a singing or lingering on of the voice frequencies will result. If the loop gains exceeds unity the system will oscillate. This acoustic feedback problem can be overcome either by maintaining the overall system gain in both channels operating simultaneously, below unity, or by alternately reducing and increasing the gain of the two channels thereby switching the direction of speech transmission. In both cases, the overall loop gain is held below the singing level.

Maintaining the system gain in both channels below unity severely limits either the area of loudspeaker coverage or the microphone sensitivity, since the acoustic loss must be considerably greater than the gain of the amplifiers to avoid singing in the system. Alternately switching the gain of the channels may be accomplished either manually, or automatically in response to the voice power in two channels.

Heretofore, various proposals have been presented for automatically switching the two channels. In the majority of the systems, variable D.-C. control voltages proportional to the signal voltage levels in two channels are derived from one of the latter stages of the amplifiers. The control voltages are then fed back to vary the gain of preceding stages in the channels, thereby controlling the direction of speech transmission. One disadvantage of this "servo-loop" system is that for fast control it is necessary to use high gain around the control loop, which tends to cause overshoot creating a switching transient and instability. Reducing the gain of the control loop remedies the above disadvantages but increases the switching transition time. A still further disadvantage of the above system is than it is impossible to completely disconnect the closed channel. The system would then lock up in one direction of transmission and it would be impossible for a speech signal in the other channel to actuate the control point of the disconnected path and reverse the direction of transmission.

An improvement upon these systems has been made in which the control voltages for each of the channels are derived from two points in the transmission system, one of which is located before and the other after the controlled stage. Here again, however, high gain around the "servo-loop" tends to generate switching transients and instability.

Ideally, it is desirable to avoid the acoustic feedback problem by completely disconnecting the closed channel. Such a system must, however, not lock out the closed channel since it is necessary that the listener can interrupt the talker at any time by interjecting his voice and thus switching the direction of transmission of the two channels. The system, therefore, must be controlled completely from the speed signal levels preceding the control or switching point. A still further requirement of the system is that it will switch from one channel to the other when a predetermined difference in speech signal level exists, i.e., a fixed db difference in speech signal level.

The latter requirement can be illustrated as follows:

The majority of switching devices operate on a fixed voltage difference between two points. For example, let us assume that one volt is required to operate a control switch such as a multivibrator or relay. If at one instant the two talkers are generating respectively 10 volts and 11 volts at the control point, a difference of 1 volt will exist and the system will switch in favour of the latter talker. This represents a difference in speech input level of $$20 \log \frac{11}{10} = 0.8 \text{ db}$$

If at a second instance the talkers are generating respectively 1.1 and 0.1 volts the difference will again be 1 volt and the system will switch in favour of the former talker. However, this now represents a difference of $$20 \log \frac{1.1}{0.1} = 20.8 \text{ db}$$

It can be seen, therefore, that this system is entirely unsatisfactory for switching the two voice channels as in one instance a relatively small difference in level (0.8 db) exists while in the other a relatively large difference (20.8 db) exists.

The disadvantages of the above systems have been overcome in the present invention by providing a control circuit for a two-way voice switch amplifier which responds to a fixed db difference in input signal level without regard to the absolute level. Such a circuit is characterized by extremely fast response to the speech signals in order that a minimum amount of information will be lost during the switching period. Because the circuit does not merely attenuate the closed channel but completely disconnects it, it is only necessary to maintain the input to the microphone in the closed channel from the output of the loudspeaker in the open channel just below that of the input to the microphone in the open channel to avoid switching chatter. Furthermore, since the control voltage is completely derived before the control point in the circuit, overshoot or thump, that is generally present in those systems utilizing the "servo-loop" control can be avoided. The basic control circuit can be used in applications other than for voiced switch amplifiers.

The invention is further described with reference to the accompanying drawings in which.

Figure 1:
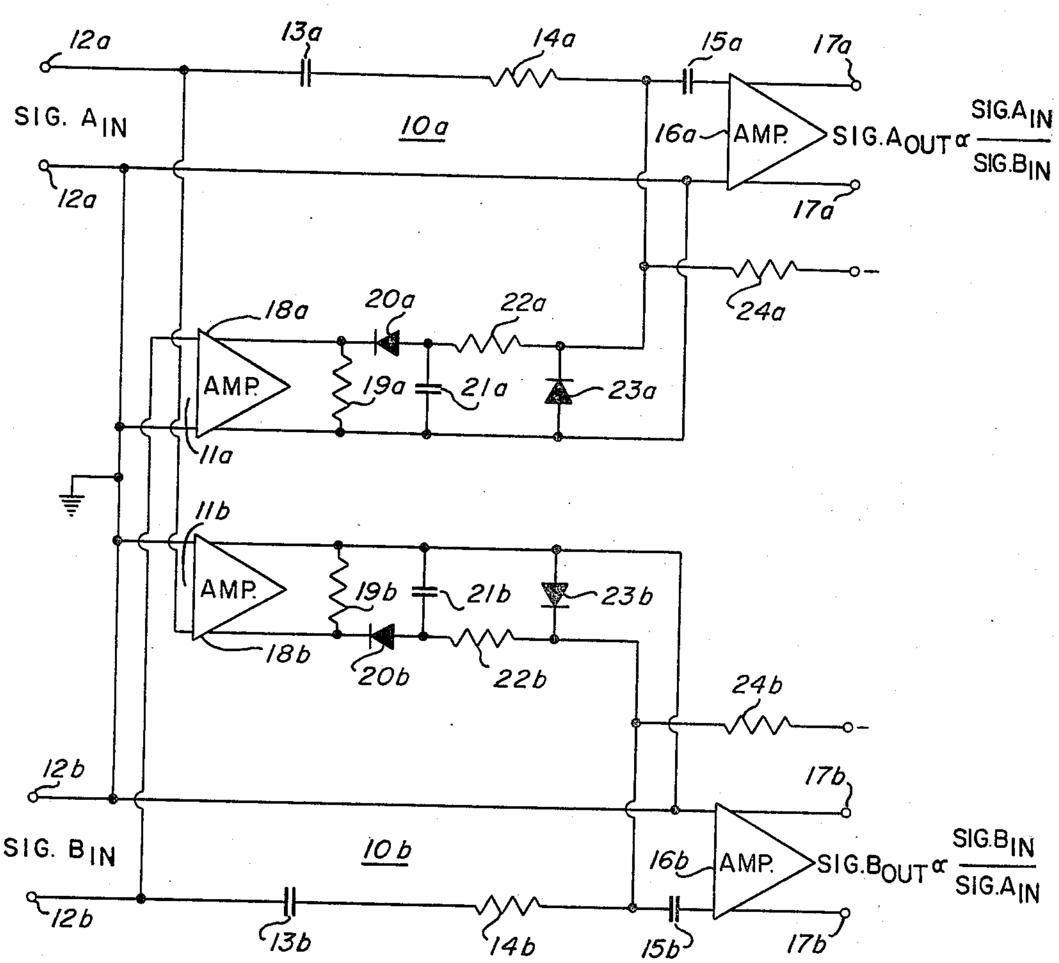
FIGURE 1 is an electrical schematic diagram of a control circuit.
Figure 2:
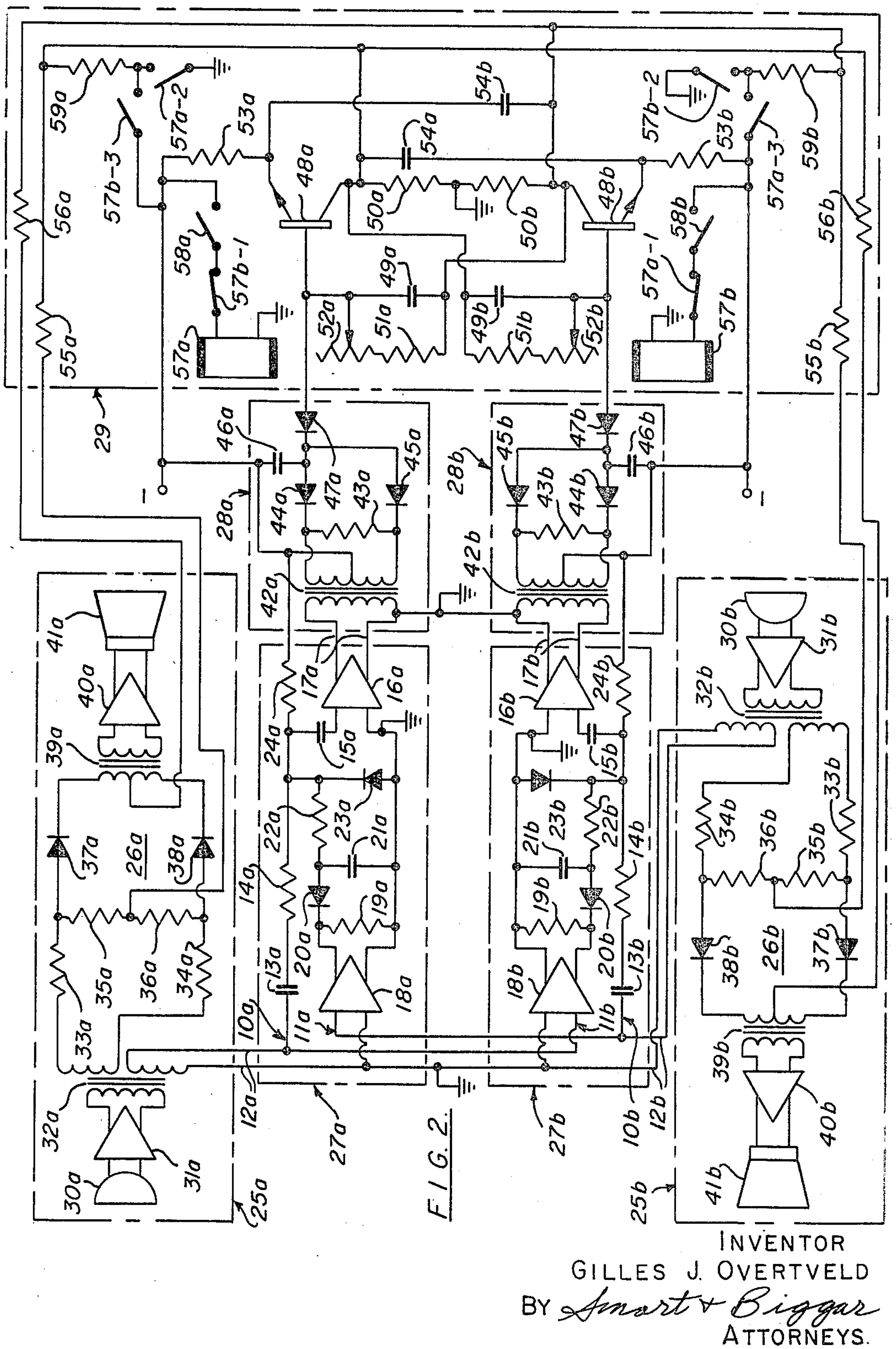
FIGURE 2 is an electrical schematic diagram of a voice switched amplifier incorporating the control circuit shown in FIGURE 1.

FIGURES 1 and 2 each consist of two channels which are basically identical. In the drawings, therefore, the reference characters of one channel will be followed by an index "*a*" and those of the other channel by an index "*b*." In the description, only the reference character will be referred to except where it is necessary to distinguish between the components of the two channels.

Referring now to FIGURE 1, each channel of the control circuit comprises a signal path 10 and a control path 11. Each signal path has input connections 12 for connecting an input signal thereto. The input signal is coupled from the input connections 12 through an input coupling capacitor 13, a resistor 14, an output coupling capacitor 15 and an amplifier 16, to output connections 17. The input signals across the input connections 12*a* and 12*b* are fed to the amplifiers 18*b* and 18*a* respectively of the control paths 11. The output signal from each of the amplifiers 18 appears across a load resistor 19. The signal is rectified by a diode 20, and the resulting D.-C. output voltage which is proportional to the input signal voltage level appears across a capacitor 21. A resistor 22 and a variolosser 23 are serially connected across the capacitor 21. The impedance of the resistor 22 is made relatively high in comparison to the impedance of the variolosser 23; thus the current through the variolosser 23 is proportional to the D.-C. voltage across the capacitor 21, which in turn is proportional to the input signal voltage level. The variolosser 23 is connected in shunt with the signal path 10 between the resistor 14 and the output coupling capacitor 15. In order to effect good control and relatively low distortion of the signal, the D.-C. current from the control path 11 across the variolosser 23 is made relatively large in comparison to the A.-C. current from the signal path 10. The impedance of the resistor 14 is made relatively high in comparison to the impedance of the variolosser 23. Thus, providing the D.-C. current through the variolosser 23 does not change, the signal voltage across the variolosser 23 will be proportional to the input signal voltage. The impedance of the variolosser 23 follows an exponential characteristic and is inversely proportional to the current through it. The signal level at the output connections 17*a* and 17*b* of each of the control paths 11 varies directly as the ratio of the two input signal voltage levels but is substantially independent of their absolute level. A resistor 24 connected between a negative D.-C. voltage and the variolosser 23, and having a relatively high impedance in comparison to the resistors 14 and 22, forward biases the variolosser 23 and sets its operating range.

Let us assume two signals A and B of equal amplitude are applied to input connections 12*a* and 12*b* respectively. The output signal A at connections 17*a* will be approximately equal to:

$$\text{SIG } A_{\text{out}} = (\text{SIG } A_{\text{in}}) \frac{Z_v}{Z_v + R_{14a}}$$

where:

$Z_v$ is the instantaneous impedance of variolosser 23*a*, and $R_{14a}$ is the resistance of the resistor 14*a*.

If the amplitude of the input signal A is now doubled the current through the resistor 14*a* will also double. By design, the impedance of the variolosser 23*a* is inversely proportional to the current through it, and the signal current through the variolosser 23*a* is small in comparison to the D.-C. control current. Thus, the total change in current through the variolosser 23*a* will be relatively small even though the amplitude of signal A has doubled. The impedance change will, therefore, be negligible and the signal output voltage at the connections 17*a* will also double.

If the amplitude of the input signal B is doubled, the total current through the variolosser 23*a* will also double, halfing the impedance of the variolosser 23*a*. Because the input signal A appearing across the variolosser 23*a* is fed from a relatively constant current source (i.e., through resistor 14*a*), the output signal A will now be halfed in amplitude.

Thus, $$\text{SIG } A_{\text{out}} \propto \text{SIG } A_{\text{in}} / \text{SIG } B_{\text{in}}$$

and $$\text{SIG } B_{\text{out}} \propto \text{SIG } B_{\text{in}} / \text{SIG } A_{\text{in}}$$

In FIGURE 2 each of the channels of the two-way voice switch amplifier comprises a signal channel 25 containing a switching network 26. A signal voltage, proportional to a speech signal at the input to the signal channel 25, is fed to a control circuit 27; the output of the control circuit 27 is fed to a rectifier network 28. The D.-C. output from the rectifier network 28 controls the state of conduction of the bi-stable multivibrator 29. This in turn controls the two switching networks 26*a* and 26*b* located in the signal channels 25*a* and 25*b* respectively, and thus determines the direction of transmission of the speech signal.

Each signal channel 25 comprises a microphone 30 used as an input electroacoustic transducer connected through a pre-amplifier 31 to the primary of a transformer 32. The balanced output of the transformer 32 is connected to the switching network 26. The network 26 comprises two series resistors 33 and 34, two shunt resistors 35 and 36 and two serially connected diodes 37 and 38. The output of the switching network 26 is connected across the primary of a transformer 39; the secondary of the transformer 39 is connected to an amplifier 40 and thence to a loudspeaker 41 used as an output electroacoustic transducer.

The unbalanced secondary of the transformer 32*a* is split into two paths; one path is fed to the signal path of the control circuit 27*a* while the other path is fed to the control path of the control circuit 27*b*. The reverse connections are made for the unbalanced secondary of the transformer 32*b*, with one path going to the signal path of the control circuit 27*b* and the other path going to the control path of the control circuit 27*a*.

The control circuit 27 is the same as that shown in FIGURE 1. Each channel comprises the signal path 10 having the input connections 12, the input coupling capacitor 13, the resistor 14, the output coupling capacitor 15, the amplifier 16 and the output connections 17; and the control path 11 having the amplifier 18, the resistor 19, the diode 20, the capacitor 21, the resistor 22, the variolosser 23 and the resistor 24. The function of these components is the same as hereinbefore described. The signal inputs to the control circuits 27 are, however, proportional to the two speech signals.

The output signal from each control circuit 27 is connected to the primary of an input transformer 42 of the rectifier network 28. The control signal voltage from the balanced secondary of the transformer 42 appears across a load resistor 43 and is then full-wave rectified to a D.-C. control voltage by diodes 44 and 45. The D.-C. control voltage is filtered by a capacitor 46. The voltage is serially connected from the output of the diodes 44 and 45 to the input of the bi-stable multivibrator 29 by a diode 47.

The bi-stable multivibrator 29 is of the conventional type, each half of which comprises a transistor 48, a positive feedback capacitor 49 and a collector load resistor 50, one end of which is connected to ground. In addition, a resistance network comprising a serially connected resistor 51 and a potentiometer 52 is placed in shunt with the positive feedback capacitor 49. This network is connected through the transistor 48 and the collector load resistor 50 to ground. The potentiometer 52 is adjusted to maintain the associated transistor 48 in a state of conduction but not completely saturated. An emitter bias resistor 53, one end of which is connected to a negative D.-C. voltage source, and a feedback capacitor 54 maintain high frequency stability in the multivibrator.

Build-out resistors 55 and 56 connect the output from the collectors of both of the transistors 48 to both of the switching networks 26. The resistors 55 and 56 provide isolation between the bi-stable multivibrator 29 and the switching networks 26, and also prevent interaction between the two switching networks 26*a* and 26*b*.

Each switching network 26 is of the conventional bridge type and is balanced so that opening or closing the diodes 37 and 38, to open or close the signal channel 25, does not result in a transient or thump at the output of the loudspeaker 41.

A relay 57, in conjunction with a switch 58 and a resistor 59, provides a manual override of the automatic control circuit. Thus, if the switch 58a is closed, a negative D.-C. supply voltage, coupled through contacts 57b–1 is placed across the relay coil 57a. This actuates the relay coil 57a, which opens contacts 57a–1 and closes contacts 57a–2 and 57a–3. Closing the contacts 57a–2 connects the collector of the transistor 48a through the resistor 59a to a ground. Closing the contacts 57a–3 connects the collector of the transistor 48b through the resistor 59b to a negative D.-C. voltage source. This forces the transistor 48b to conduct and the transistor 48a to shut off, thereby opening the signal channel 25a and closing the signal channel 25b. Contacts 57a–1 provide an interlock for the manual override circuit. Once the relay 57a has been actuated, the contacts 57a–1 open and the relay 57b is prevented from operating.

The following is a detailed description of the operation of the voice switched amplifier. When no speech signal inputs are present, the multivibrator 29 will be in one state of conduction or the other. Let us assume at the beginning the transistor 48a is conducting and the transistor 48b is non-conducting. The current through the collector load resistor 50a results in a negative voltage on the collector of the transistor 48a. Because the transistor 48b is non-conducting, its collector will be approximately at ground potential. This in turn forward biases the diodes 37b and 38b of the switching network 26b, the path being completed through the build-out resistors 55b and 56, the shunt resistors 35b and 36b, and the primary of the transformer 39b. It also reverse biases the diodes 37a and 38a of the switching network 26a; thereby resulting in the signal channel 25b being opened and the signal channel 25a being closed. The output signal voltage from the microphone 30a proportional to the speech signal input to the microphone 30a is connected to the signal path 10a of the control circuit 27a and the control path 11b of the control circuit 27b through the amplifier 31a and the transformer 32a. If at the moment no speech signal is present at the microphone 30b, a relatively large output voltage will be obtained at the output connections 17a of the control circuit 27a, and virtually no output voltage at the output connections 17b. The outputs from each of the circuits 27 being proportional to the two input speech signal levels, as previously explained in the description of FIGURE 1. The control signal voltage at the connections 17a is coupled through the transformer 42a to the full-wave rectifier comprising the diodes 44a and 45a. The capacitor 46a filters the D.-C. output voltage which is then coupled through the diode 47a to the base of the transistor 48a. The center tap of the transformer 41a is connected to a negative voltage supply. This forward biases the diodes 44a, 45a and 47a, and they in conjunction with the resistor 51a, the potentiometer 52a and the resistor 50b set the operating point of the transistor 48a. The diodes 44 and 45 are serially connected to the diode 47 to obtain the desired forward voltage drop and help establish the proper operating point for the transistor 48.

The diodes 44, 45 and 47 also function to increase the switching sensitivity of the bi-stable multivibrator 29. For example, let us assume the transistor 48a is conducting and the transistor 48b is non-conducting. A small increase in the output of the control circuit 27a results in a negative increase in the D.-C. outputs of the rectifier network 28a, thereby decreasing the base current of the transistor 48a. This in turn, decreases the collector current of the transistor 48a and through multivibrator action increases the collector current of the transistor 48b. Increasing the D.-C. current through the diodes 44a, 45a and 47a lowers their impedance logarithmically and in effect decreases the source impedance of the rectifier network 28a, thereby accelerating the increase of the negative voltage at the base of the transistor 48a which very quickly switches over the bi-stable multivibrator 29. The voltages at each of the collectors of the transistors 48 are now reversed, that of the transistor 48a decreasing to approximately ground potential while that of the transistor 48b increasing negatively. This, in turn, forward biases the diodes 37a and 38a of the switching network 26a thereby opening the signal channel 25a. Conversely, it reverse biases the diodes 37b and 38b of the switching network 26b, thereby closing the signal channel 25b.

Prior to switching over the multivibrator 29, the diodes 44b, 45b and 47b are virtually cut off by the negative voltage on the collector of the conducting transistor 48a, which is coupled to the diode 47b through the resistor 51b and the potentiometer 52b. Thus, the rectifier network 28b presents a high impedance to the multivibrator 29 at this time, the rectifier network 28b therefore, does not load the multivibrator 29 which further increases the sensitivity of the multivibrator 29.

The talker at the microphone 30b can interrupt the talker at the microphone 30a at any time by raising his voice level at least a fixed number of db above that of the talker at the microphone 30a. The output voltage from the control circuit 27b, which is proportional to the two speech input signals, is rectified by the control circuit 28b which, in turn, shuts off the transistor 48b and turns on the transistor 48a. This will reverse the direction of speech transmission by closing the channel 25a and opening the channel 25b.

The switching time of the signal channels 25 is limited only by the response time of the control circuit 27 and the multivibrator 29. Since the switching network 26 is controlled completely from the front of the system, the amplifier does not suffer from transient overshoot when the multivibrator 29 reverses the direction of transmission and also cannot lock up in one direction of transmission. Since the switching network 26 completely closes one channel, it is necessary to maintain the output speech signal level of the loudspeaker 41 in the open channel reaching the adjacent microphone 30 in the closed channel, just below that of the input speech signal level reaching the microphone 30 in the open channel, to avoid both switching instability and acoustic feedback.

What I claim as my invention is:

1. A two-way communications system comprising: a first and a second channel, said first channel having a first and a second electroacoustic transducer for coupling a first speech signal thereto and therefrom respectively, said first transducer adapted to convert the first speech signal to a first signal voltage; said second channel having a third and a fourth electroacoustic transducer for coupling a second speech signal thereto and therefrom respectively, and third transducer adapted to convert to second speech signal to a second signal voltage; each of said channels including a switching network for controlling the signal transmission therethrough; a first control circuit for producing a first unidirectional voltage which is directly proportional to the ratio of the first and second signal voltages; a second control circuit for producing a second unidirectional voltage which is directly proportional to the ratio of the second and first signal voltages, the levels of said first and second unidirectional voltages being substantially independent of the absolute levels of the first and second signal voltages; means responsive to said first and second unidirectional voltages for controlling the switching networks, so as to open and close the first and second channels respectively when the first unidirectional voltage exceeds a predetermined amplitude, and so as to open and close the second and first channels respectively when the second unidirectional voltage exceeds a predetermined amplitude.

2. A two-way communications system as defined in claim 1 in which the first control circuit comprises: a first variolosser means for connecting a first signal current which is proportional to the first signal voltage across the first variolosser, mean for rectifying the second signal voltage, means for connecting the rectified second signal voltage across the first variolosser, and means for rectifying the resultant signal voltage across the first variolosser so as to produce the first unidirectional voltage; and in which the second control circuit comprises: a second variolosser means for connecting a second signal current which is proportional to the second signal voltage across the second variolosser, means for rectifying the first signal voltage, means for connecting the rectified first signal voltage across the second variolosser, and means for rectifying the resultant signal voltage across the second variolosser so as to produce the second unidirectional voltage.

3. A two-way communications system as defined in claim 2 in which each of the variolossers has a substantially exponential characteristic.

4. A two-way communications system as defined in claim 3 in which the means responsive to said first and second unidirectional voltages for inversely controlling the switching networks comprises: a bistable multivibrator including a cross connected pair of transistors each having a base, an emitter and a collector, the first unidirectional voltage being connected to one base, the second unidirectional voltage being connected to the other base, means for connecting the collector electrodes to each of the switching networks in the first and second channels so as to pass a control current therethrough and thereby actuate said switching networks.

References Cited by the Examiner

UNITED STATES PATENTS

| | | | |
|---|---|---|---|
| 2,205,142 | 6/1940 | Hoard | 179—170.6 |
| 2,468,553 | 4/1949 | Herrick | 179—170.8 |
| 2,497,779 | 2/1950 | Lanham | 179—170.8 |
| 3,215,789 | 11/1965 | Hunter et al. | 179—170.6 |

KATHLEEN H. CLAFFY, *Primary Examiner.*

H. ZELLER, *Assistant Examiner.*